US011512230B1

(12) United States Patent
Wildeman

(10) Patent No.: US 11,512,230 B1
(45) Date of Patent: Nov. 29, 2022

(54) STITCH BONDED FOAM TAPE PRODUCT AND METHOD

(71) Applicant: TIETEX INTERNATIONAL, LTD., Spartanburg, SC (US)

(72) Inventor: Martin Wildeman, Spartanburg, SC (US)

(73) Assignee: TIETEX INTERNATIONAL LTD, Spartanburg, SC (US)

( * ) Notice: Subject to any disclaimer, the term of this patent is extended or adjusted under 35 U.S.C. 154(b) by 359 days.

(21) Appl. No.: 16/388,366

(22) Filed: Apr. 18, 2019

Related U.S. Application Data

(60) Provisional application No. 62/659,792, filed on Apr. 19, 2018.

(51) Int. Cl.
*C09J 7/38* (2018.01)
*C09J 7/21* (2018.01)
*B32B 5/06* (2006.01)

(52) U.S. Cl.
CPC .................. *C09J 7/38* (2018.01); *B32B 5/06* (2013.01); *C09J 7/21* (2018.01); *B32B 2305/02* (2013.01); *B32B 2405/00* (2013.01); *C09J 2203/302* (2013.01); *C09J 2400/243* (2013.01)

(58) Field of Classification Search
CPC .. C09J 2400/243; C09J 2203/302; C09J 7/20; C09J 7/21; C09J 7/26; C09J 7/38; B32B 5/06; B32B 2305/02; B32B 2405/00
See application file for complete search history.

(56) References Cited

U.S. PATENT DOCUMENTS

| 3,392,078 | A | * | 7/1968 | Duhl | D04H 11/00 428/88 |
| 4,411,939 | A | * | 10/1983 | Hawkins | E04C 2/24 428/58 |
| 8,062,446 | B1 | * | 11/2011 | Beauregard | B32B 5/18 156/224 |
| 8,429,764 | B2 | * | 4/2013 | Riccelli | B32B 7/12 2/93 |
| 2007/0149076 | A1 | * | 6/2007 | Van Moeseke | B32B 25/045 442/134 |
| 2011/0318569 | A1 | * | 12/2011 | Kobayashi | B32B 5/022 428/317.3 |
| 2017/0120557 | A1 | * | 5/2017 | Pickren | B32B 37/10 |
| 2018/0171519 | A1 | * | 6/2018 | Wildeman | B32B 27/30 |

FOREIGN PATENT DOCUMENTS

| DE | 102007030567 B3 | * | 1/2009 | ............... C09J 7/04 |
| WO | WO-03037618 A1 | * | 5/2003 | ........... G10K 11/168 |

OTHER PUBLICATIONS

Machine Translation of DE 10 2007 030567 B3 (Year: 2009).*

* cited by examiner

*Primary Examiner* — Scott R. Walshon
(74) *Attorney, Agent, or Firm* — J.M. Robertson, LLC

(57) ABSTRACT

An adhesive tape product incorporating foam that is stitch-bonded with a stitching yarn to provide substantial dimensional stability in the machine direction without sacrificing the sound dampening and insulation properties of the foam. A pressure sensitive adhesive is disposed in overlying relation to at least one face of the foam. One or more fibrous layers may be positioned between the foam and the adhesive.

8 Claims, 3 Drawing Sheets

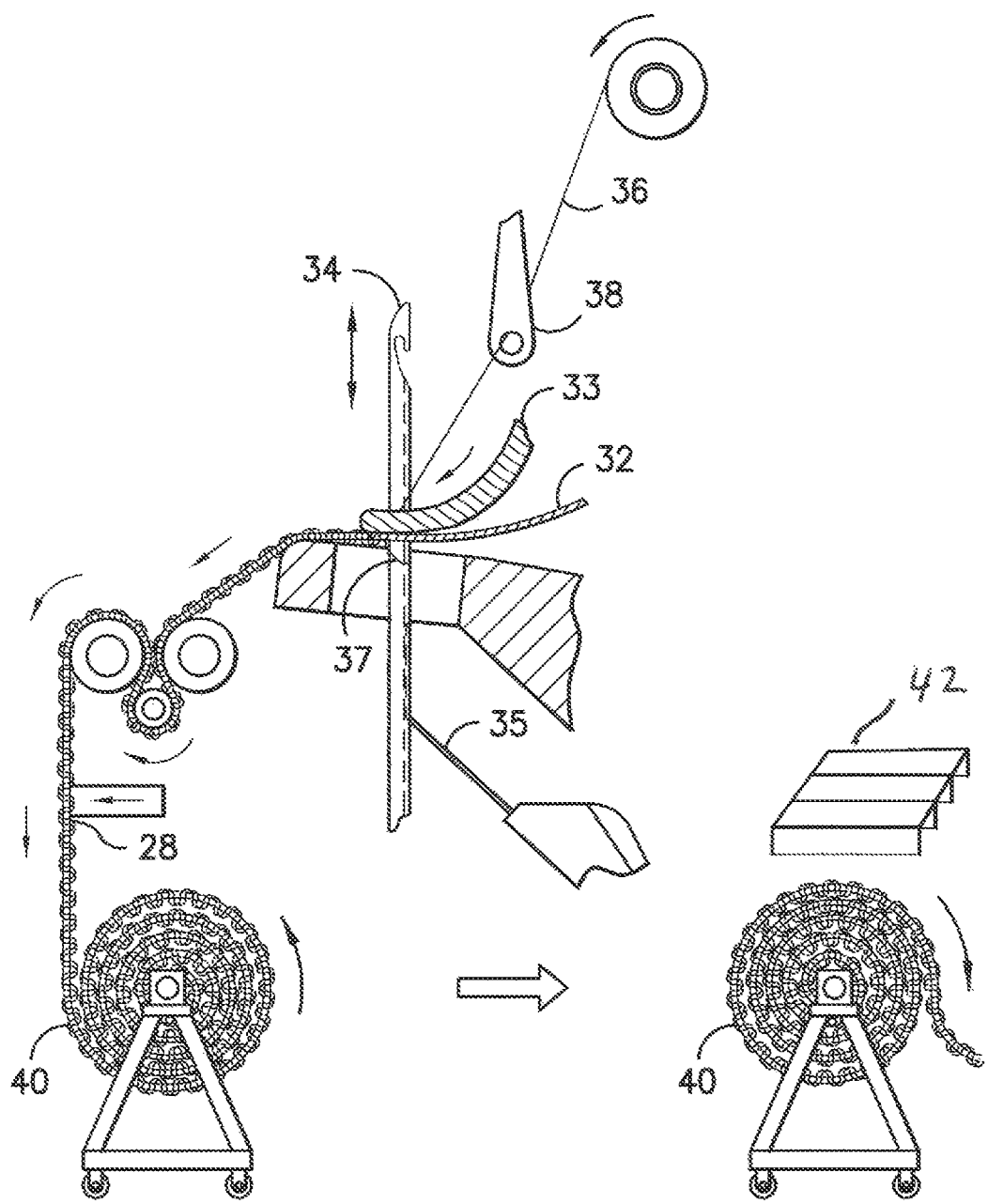
FIG. -1-

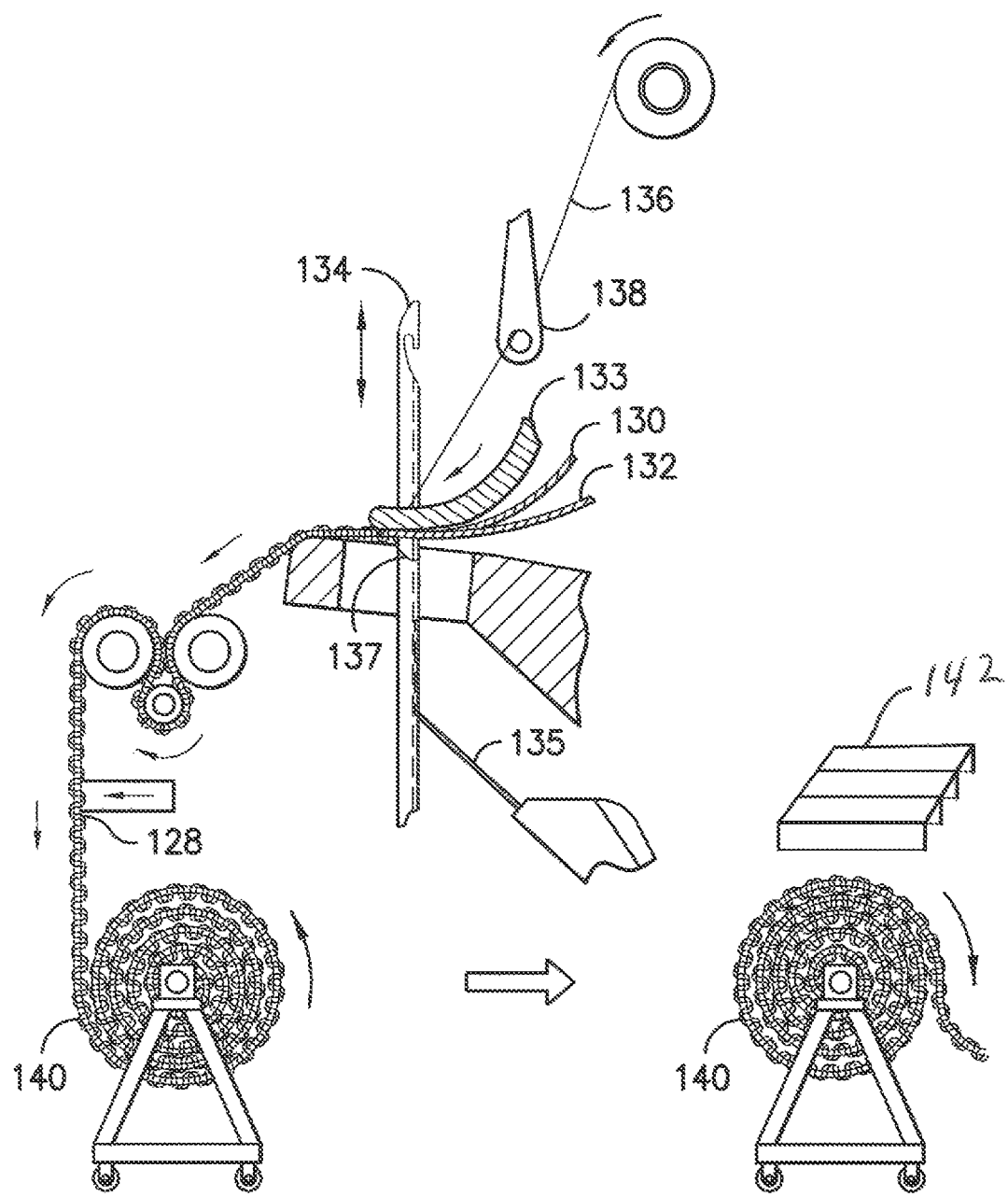
FIG. -2-

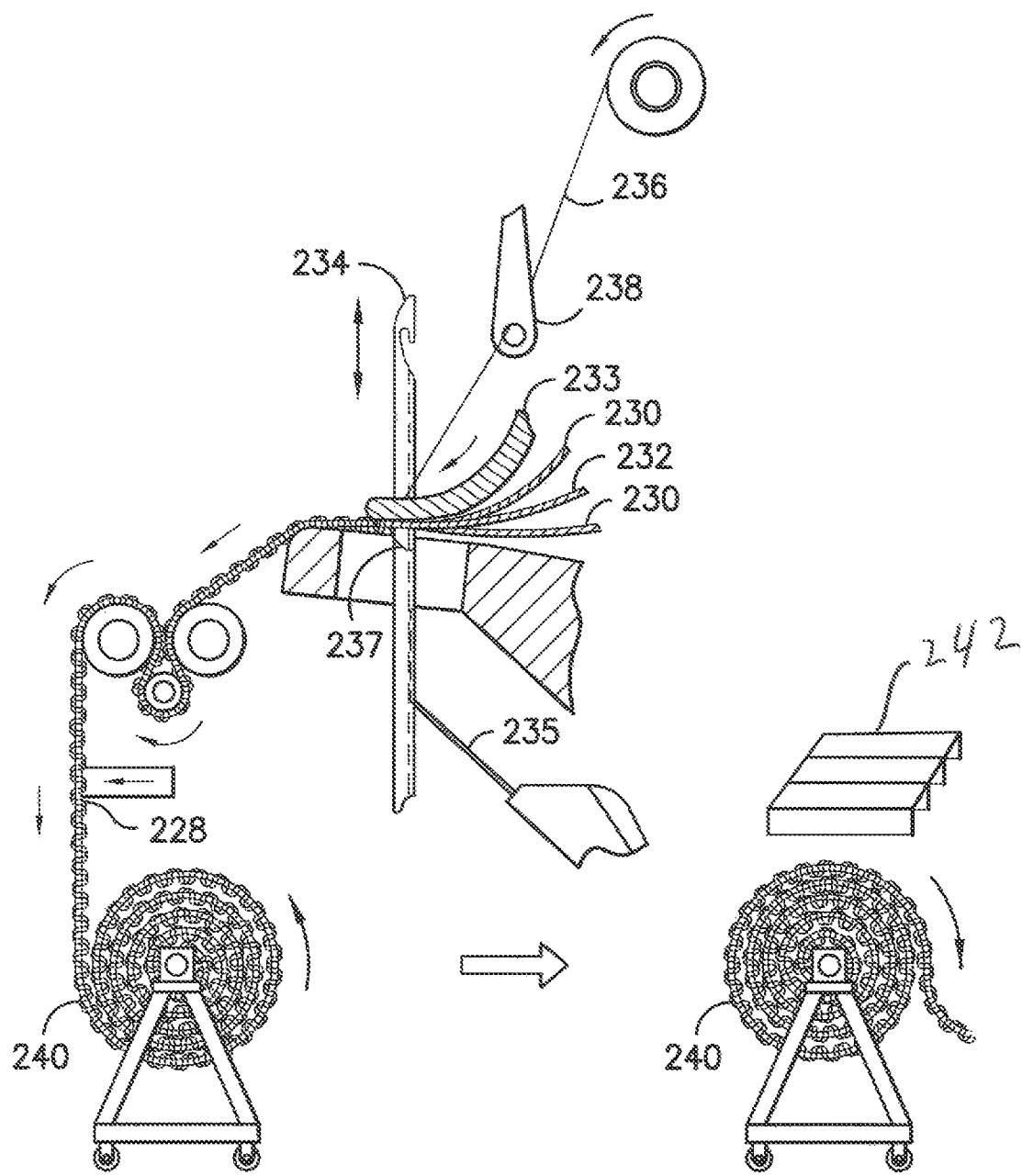
FIG. -3-

STITCH BONDED FOAM TAPE PRODUCT AND METHOD

CROSS-REFERENCE TO RELATED APPLICATIONS

This nonprovisional application claims the benefit of, and priority from, provisional application 62/659,792 the contents of which are hereby incorporated by reference in their entirety as if fully set forth herein.

TECHNICAL FIELD

The present disclosure relates generally to adhesive tape products. More particularly, the disclosure relates to adhesive tapes incorporating at least one layer of stitch-bonded foam. Such tapes may have desirable noise damping and sound insulation properties. By way of example only, and not limitation, such tapes may be used as so called "Wire Harness Tape" for wrapping electrical wiring cables and the like in automobile applications where sound dampening and insulation are desired. Such tapes may likewise be used in other applications as well.

BACKGROUND

Tape products incorporating foam layers in combination with pressure sensitive adhesive (PSA) are known. Such tape products provide noise dampening and sound insulation properties as may be desirable in automotive applications such as wrapping electrical cables and the like. However, low density foam may tend to elongate and/or break when placed under machine directional tension during coating and winding onto rolls. While these deficiencies may be addressed to some degree by using thicker and/or heavier foam layers, such approaches necessarily add cost and weight to the products. Thus, the use of foam layers in tape products currently faces inherent limitations. Accordingly, a tape product that incorporates a thin, low density foam layer that can be processed without undue elongation and deformation while still retaining the benefits of the foam would represent a useful advancement over the current art.

SUMMARY OF THE DISCLOSURE

The present disclosure provides advantages and alternatives over the current art by providing a tape product incorporating a relatively thin, low density foam that is stitch-bonded with a stitching yarn to provide substantial dimensional stability in the machine direction without sacrificing the sound dampening and insulation properties of the foam. In this regard, in such a stitch-bonding process, a multiplicity of stitching yarns are passed repeatedly in stitching relation through a substrate incorporating one or more layers of foam so as to form a coordinated arrangement of stitches through the substrate. It is possible to use such stitch-bonding techniques to form disperse stitching patterns with substantial separation between stitch lines as well as patterns using closely spaced stitch lines to substantially cover the substrate surface. It is also possible to impart patterns of stitching yarns across the surface by manipulation of the formation process. Such patterns may use upstanding loops, substantially flat stitches or combinations thereof.

The machine directional stabilization provided by stitch-bonding facilitates effective processing under tension on high speed adhesive coating equipment and during subsequent slitting and winding in order to convert the material into rolls of tape

BRIEF DESCRIPTION OF THE DRAWING(S)

FIG. 1 illustrates schematically an exemplary single bar stitch bonding system adapted to form a pressure sensitive adhesive tape product incorporating a low-density foam substrate consistent with the present disclosure;

FIG. 2 illustrates schematically an exemplary single bar stitch bonding system adapted to form a pressure sensitive adhesive tape product incorporating a low-density foam substrate and a fibrous covering layer across one side consistent with the present disclosure;

FIG. 3 illustrates schematically an exemplary single bar stitch bonding system adapted to form a pressure sensitive adhesive tape product incorporating a low-density foam substrate and fibrous covering layers across opposing sides of the foam consistent with the present disclosure.

While the tape products of the present disclosure will hereinafter be described in connection with certain exemplary embodiments and practices, it is to be understood that in no event is the disclosure to be limited to such illustrated and described embodiments and practices. On the contrary, it is intended that the present disclosure shall extend to all alternatives and modifications as may embrace the general principles of this disclosure within the full and true spirit and scope thereof.

DESCRIPTION OF THE PREFERRED EMBODIMENTS

Turning now to the drawings, FIG. 1 illustrates schematically an exemplary single bar stitch-bonding system which may be utilized to form a pressure sensitive adhesive tape product consistent with the present disclosure. In this regard, it is to be understood that while a single bar system is illustrated, it is likewise contemplated that other constructions such as a two-bar, or three-bar construction also may be used if desired.

As will be appreciated, in the stitch-bonding process, a pattern stitches is formed by passing stitching yarns through one or more layers of substrate material such that the stitching yarns cooperatively form rows of stiches running along the machine direction. In this regard, the space between stitching lines may be adjusted as desired to obtain desired benefits. Moreover, stitching yarns may be shifted between needles during stitching if desired to provide different stitch patterns rather than straight line patterns if desired.

In the illustrated exemplary practice shown in FIG. 1, at least one low density foam substrate layer 32 may be conveyed to a stitch-forming position in the direction indicated by the arrows. In accordance with one exemplary practice, the foam substrate layer 32 may be either a polyether or polyester based polyurethane foam that is peeled to a very low thickness. In this regard, in one exemplary practice, the foam substrate layer 32 may have a thickness of about 0.2 mm to about 5 mm, and more preferably less than about 1 mm. However, greater and lesser thickness levels may be used if desired. By way of example only, and not limitation, in one exemplary practice, the foam substrate layer 32 may have a thickness of about 0.89 mm (0.035 inches). Other resilient foams such as latex rubber foam and the like may also be used if desired.

The foam which is utilized may be a flame-retardant foam incorporating a non-halogen-based FR additive such that the foam complies with Federal Motor Vehicle Safety Standard 302 directed to flammability of components used in automobiles. As indicated, the foam may be a low-density foam having a mass per unit volume of about 0.02 to about 6 pounds per cubic foot. However, higher and lower densities may be used if desired. In one exemplary practice, the foam may be a polyether foam with a density of about 1.24 pounds per cubic foot.

As indicated previously, the foam substrate layer 32 is stitch-bonded to provide enhanced dimensional stability in the machine direction. As illustrated, the stitch bonding machine typically incorporates a row of reciprocating needles 34 (only one shown) extending in adjacent relation to one another across the width of the stitching substrate. So called "sinker fingers" 33 (also known as nebs) may extend from a sinker bar for disposition between the needles to aid in pressing plies of substrate material together if desired. However, the sinker fingers 33 may also be eliminated if desired.

As will be appreciated by those of skill in the art, during the stitch-bonding process a needle 34 (shown in greatly exaggerated dimension) pierces the substrate material and engages stitching yarns delivered into position by the yarn guides such that the stitching yarns are captured within a hook portion of the needle 34. As the needle is reciprocated downwardly, a closing element 35 such as a closing wire which moves relative to the needle 34 closes the hook portion to hold the stitching yarns therein. With the hook portion closed, the captured stitching yarns are pulled through the interior of an immediately preceding yarn loop 37 disposed around the shank of the needle 34 at a position below the substrate material 30. As the captured stitching yarns are pulled through the interior of the preceding yarn loop 37 a stitch is formed which is knocked off of the needle 34. As the needle 34 is raised back through the substrate material, the hook portion is reopened and a new yarn loop 37 moves out of the hook portion and is held around the shank of the needle 34 for acceptance of captured yarns and formation of a subsequent stitch during the next down stroke. During this process individual stitching yarns may be held at a single needle 34 to form a simple chain stitch or may be shifted back and forth laterally between needles to form other patterns.

According to the illustrated exemplary practice, a single yarn system (i.e. one bar) may be used to form stitches through the foam substrate layer 32. However, other stitching systems such as two-bar and three-bar systems may likewise be used if desired. By way of example only, and not limitation, in the illustrated one bar construction, stitching yarns 36 of polyester or the like carried by a guide 38 may be stitched in a chain stitch arrangement through the foam substrate layer. By way of example only, and not limitation, the stitching yarns 36 may be a multifilament yarn having a linear density of about 20 denier to about 600 denier, although higher and lower linear densities may be used if desired. Moreover, other yarn constructions including monofilament may likewise be utilized if desired.

In accordance with one exemplary practice, the stitching yarns 36 may be stitched through the foam at about 14 gauge (stitch lines per inch in the cross-machine direction) with about 21 courses per inch in the machine direction. The stitching pattern may be a simple chain stitch, although other stitching patterns may be used if desired. By way of example only, if a chain stitch is not used, the stitching yarns may be stitched in a so-called tricot stitch pattern having a stitch notation such as 1.0/1.2 or the like. As will be appreciated, in such a pattern the yarns are shifted between needles during stitching. Such patterns where the yarns cross between needles may provide additional reinforcement in the cross-machine direction.

The final resulting product incorporates the noise dampening and sound insulation benefits of the foam substrate with substantial strength in the machine direction to facilitate the desired processing steps and to provide strength during ultimate use. In this regard, regardless of the yarn type and stich pattern that may be used, the stitching yarns will enhance the tensile strength and reduce elongation of the tape product. Moreover, the foam substrate will retain a degree of thickness and compressibility. Such features are generally desirable to maintain sound insulation in a tape product being used to hold individual wires together in an automotive application.

As illustrated, in accordance with one exemplary practice, following the stitch-bonding process, a pressure sensitive adhesive 28 (PSA) may be applied across one or both sides of the stitched substrate. The substrate with the applied PSA may then be wrapped on a roll 40 for subsequent slitting using a knife 42 and rewinding into useful roll products. However, any other processing steps as may be desired may also be applied. By way of example only, and not limitation, if PSA is applied to both sides of the stitched foam, the resulting tape structure may find application as a 3-dimensional "mounting tape" or the like. In such a structure, the stitching yarns would provide a benefit of reinforcement through the foam in the z-axis in addition to the machine direction stabilization.

FIG. 2 illustrates another exemplary practice and construction in accordance with the present disclosure wherein like elements to those previously described are designated by like reference numerals increased by 100. As shown in FIG. 2, the foam substrate layer 132 as described previously may be delivered to the stitch-bonding zone in juxtaposed relation to a fibrous surface layer 130. In this regard, although the fibrous surface layer 130 is illustrated as being above the foam substrate layer 132, it may likewise be below the foam substrate layer 132 if desired. The foam substrate layer 132 and fibrous surface layer 130 are then stitch-bonded together by stitching yarn 136 using techniques as described previously.

In accordance with one exemplary practice, the surface layer 130 may be a spun bonded polypropylene fleece having a mass per unit area of about 2 to 50 grams per square meter. However, higher and lower weights may be used if desired. By way of example only, and not limitation, in one exemplary practice, the fibrous surface layer 130 may be an 8 gram per square meter polypropylene spunbond. It is contemplated that the inclusion of a spunbond layer in juxtaposed stitched relation to a foam substrate layer 132 may aid in preventing excess strike-through during the application of the PSA as well as providing better adhesion of the PSA to the uncoated surface. The spunbond surfaces may also provide a degree of improvement in cross-directional tensile strength and surface abrasion resistance in the resulting tape.

FIG. 3 illustrates another exemplary practice and construction in accordance with the present disclosure wherein like elements to those previously described are designated by like reference numerals increased by 200. As shown in FIG. 3, a foam substrate layer 232 as described previously may be delivered to the stitch-bonding zone in sandwiched relation to a pair of fibrous surface layers 230. In this regard, although the fibrous surface layers 230 may be substantially similar, it is likewise contemplated that they may also be different if desired. The foam substrate layer 232 and fibrous surface layers 230 are then stitch-bonded together by stitching yarns 236 using techniques and materials as described previously.

In accordance with one exemplary practice, the surface layers 230 each may be a spun bonded polypropylene fleece having a mass per unit area of about 2 to 50 grams per square meter. However, higher and lower weights may be used if desired. By way of example only, and not limitation, in one exemplary practice, the fibrous surface layers 230 each may be an 8 gram per square meter polypropylene spunbond. It is contemplated that the inclusion of a spunbond layers in sandwiching relation to a foam substrate layer 232 may aid in preventing excess strike-through during the application of the PSA as well as providing better adhesion of the PSA to the uncoated surface. As noted previously, the spunbond surfaces may also provide a degree of improvement in cross-directional tensile strength and surface abrasion resistance in the resulting tape.

In accordance with yet another exemplary practice, it is contemplated that any of the previously described structures may be stitched with at least a second yarn system in a so called "two-bar" or "three-bar" stitch-bonded structure. In such a structure, the first stitching yarn 36, 136, 236, may form substantially flat stitches across the underlying substrate. The additional yarn system(s) may be passed between needles over the sinker fingers 33, 133, 233 during stitching so as to form upstanding surface loops.

By way of example only, and not limitation, the yarns forming surface loops may have a linear density of about 20 denier to about 600 denier although higher and lower denier levels may be used if desired. One such suitable yarn may be a 40 denier/12 filament fully oriented polyester yarn. However, other yarn constructions and filament counts may likewise be utilized if desired.

In accordance with one exemplary practice, the loop forming yarns may be microfiber yarns formed from ultra-fine fibers of less than 1 denier per filament (dpf). Such yarns are characterized by a soft feel and very high effective surface area. In this regard, such microfiber yarns may be made up of at least a predominant percentage of fiber with a dpf level of less than 1 and will more preferably be made up of at least a predominant percentage of fiber with a dpf level of less than 0.6 and will most preferably be made up of at least a predominant percentage of fiber with a dpf level of less than 0.4 when evaluated on a weight basis. That is, according to one exemplary practice, 51% or more of the fiber weight in the stitching yarns may be made up of fibers with these dpf levels. In accordance with one exemplary embodiment, such microfiber yarns may be formed substantially entirely from fiber with a dpf level of about 0.4 or less. By way of example only, and not limitation, one such microfiber yarn construction is a 150/288 (i.e. 150 denier, 288 filament) textured polyester yarn. While polyester may be potentially desirable for the stitching yarns, other natural or synthetic materials including nylon, polypropylene, cotton or blends of any identified materials also may be used if desired.

The resulting product with loops across one side may include PSA applied across the surface facing away from the loops. Such a product may be used for a number of applications including hook and loop closure systems.

Of course, variations and modifications of the foregoing are within the scope of the present disclosure. Thus, it is to be understood that the disclosure disclosed and defined herein extends to all alternative combinations of two or more of the individual features mentioned or evident from the text and/or drawings. All of these different combinations constitute various alternative aspects of the disclosure. The embodiment described herein explain the best modes for practicing the disclosure and will enable others skilled in the art to utilize the disclosure.

The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Various features of the disclosure are set forth in the following claims.

What is claimed is:

1. An adhesive tape comprising:
   at least one layer of foam having a first face and a second face, said at least one layer of foam having a thickness in the range of 0.2 mm to 5 mm and a mass per unit volume of 0.5 to 2.5 pounds per cubic foot;
   at least one layer of pressure sensitive adhesive disposed in overlying relation to at least the first face of said at least one layer of foam;
   at least a first fibrous textile layer comprising polypropylene fleece disposed between said first face of said at least one layer of foam and said at least one layer of pressure sensitive adhesive;
   at least a second fibrous textile layer comprising polypropylene fleece disposed in overlying juxtaposed relation to said second face of said at least one layer of foam; and
   a plurality of stitching yarns disposed in stitch-bonded relation through each of said at least one layer of foam, said first fibrous textile layer and said second fibrous textile layer, said stitching yarns operatively connecting said at least one layer of foam to said first fibrous textile layer and said second fibrous textile layer.

2. The adhesive tape as recited in claim 1, wherein the stitching yarns are in a chain stitch pattern.

3. The adhesive tape as recited in claim 1, wherein the stitching yarns are disposed in a stitching pattern crossing between needle lines.

4. The adhesive tape as recited in claim 1, wherein the stitching yarns comprise microfiber yarns formed from fibers of less than 1 denier per filament.

5. The adhesive tape as recited in claim 4, wherein the stitching yarns define a plurality of upstanding surface loops disposed across a side of the adhesive tape not covered by pressure sensitive adhesive.

6. An adhesive tape comprising:

at least one layer of polyurethane foam having a first face and a second face, said at least one layer of polyurethane foam having a thickness in the range of 0.2 mm to 5 mm and a mass per unit volume of 0.5 to 2.5 pounds per cubic foot;

at least one layer of pressure sensitive adhesive disposed in overlying relation to at least the first face of said at least one layer of polyurethane foam at least a first fibrous textile layer comprising polypropylene fleece disposed between said first face of said at least one layer of foam and said at least one layer of pressure sensitive adhesive;

at least a second fibrous textile layer comprising polypropylene fleece disposed in overlying juxtaposed relation to said second face of said at least one layer of foam; and a plurality of polyester stitching yarns having a linear density in the range of 20 denier to 600 denier disposed in stitch-bonded relation through each of said at least one layer of polyurethane foam, said first fibrous textile layer and said second fibrous textile layer, said stitching yarns operatively connecting said at least one layer of foam to said first fibrous textile layer and said second fibrous textile layer.

7. The adhesive tape as recited in claim 6, wherein the stitching yarns are in a chain stitch pattern.

8. The adhesive tape as recited in claim 6, wherein the stitching yarns are disposed in a stitching pattern crossing between needle lines.

* * * * *